United States Patent [19]
Daribi

[11] Patent Number: 6,066,980
[45] Date of Patent: May 23, 2000

[54] NEAR NYQUIST RATE VARIABLE RATE RECEIVER

[75] Inventor: Dariush Daribi, Fremont, Calif.

[73] Assignee: LSI Logic Corporation, Milpitas, Calif.

[21] Appl. No.: 09/057,104

[22] Filed: Apr. 7, 1998

[51] Int. Cl.[7] ............................... H03B 1/00; H03K 5/00
[52] U.S. Cl. ............................................................. 327/552
[58] Field of Search ...................... 327/551, 552, 327/553, 554; 341/76, 143, 155, 110, 144

[56] References Cited

U.S. PATENT DOCUMENTS

| 5,122,874 | 6/1992 | Lhuiller et al. ......................... 358/133 |
| 5,815,507 | 9/1998 | Vinggaard et al. ...................... 371/5.1 |
| 5,835,672 | 11/1998 | Yagasaki et al. ....................... 386/111 |
| 5,841,387 | 11/1998 | VanBuskirk ............................. 341/155 |
| 5,874,910 | 2/1999 | Cooper ................................... 341/143 |

*Primary Examiner*—My-Trang Nuton

[57] ABSTRACT

A digital variable rate demodulator within a receiver operates close to the Nyquist rate. This serves to recover correct timing and filter adjacent channels. The samples of an incoming data signal are divided into phases and combined into phase vectors. Intermediate points within a given phase vector are determined by interpolation. The data is then converted into a weighted sum for the purpose of decimating down to the baud rate. The signal-to-noise ratio is then optimized by estimating the likelihood of occurrence of a given symbol within the waveform and filtering the near Nyquist data rate down to a one sample per symbol data rate.

18 Claims, 5 Drawing Sheets

NEAR NYQUIST RATE VARIABLE RATE RECEIVER

BACKGROUND OF THE INVENTION

1. Field of the Invention

The present invention relates to digital signal receivers. More specifically, the present invention relates to a digital variable rate demodulator operating close to the Nyquist rate.

2. The Background

In a communication system, data is typically formatted onto a carrier signal and conveyed via a transmitter. Once the signal travels through some intervening medium, it is received and decoded by the receiver. In theory, the waveform of the data transmitted would remain unaltered during the transmission process. However, in practice, the waveform is distorted and corrupted by its passage through the electronic circuitry of the transmitter and receiver, as well as, through the intervening medium. Thus, the receiver serves the dual purpose of decoding and insuring that the received signal is free from corrupt signal data that has been introduced during the communication process.

By example, in a standard satellite communication system a data signal is created at one location, encoded onto a radio signal, and transmitted to a satellite which may be in synchronous orbit above the earth. The satellite then retransmits the received signal to another location, where it is received and demodulated. In such a communication process, the data carrying signal is likely to have passed through several electronic systems, free space distances in excess of 40,000 miles, and twice through the atmosphere; subjecting the signal to numerous encounters with interference and distortion.

Historically, the transmitted signal had a fixed data rate known to the receiver which allowed for the receiver to be configured for the precise characteristics of the known transmitted signal. Currently, the trend is toward having the capability to vary the data rate to accommodate the desire for variance in satellite channel signals. For example, a single satellite channel may be used to carry various types of data signals, some of which are transmitted at low data rates and some of which are transmitted at high data rates. In another example, when the satellite signal carries compressed data, it may be desirable to vary the data rate for a given channel depending on the programming to be broadcasted. Thus, based on the differences in the speed of the action, a video feed of public service announcements would require a lower data rate than a video feed of a more data-intense activity, such as, a sporting event.

Current variable rate digital communication receivers, such as satellite receivers or cable receivers, use hybrids of analog and digital techniques or pure digital circuitry to implement the filter scheme within the demodulator. A demodulator within a digital signal receiver acts to recover an original signal from a modulated carrier.

In order to provide a variable bandwidth filter structure, the analog/digital hybrid techniques rely on changing the sampling frequency and using different filters according to the required bandwidth. Thus, for a given data rate and given filter structure, the filter bandwidth can be adjusted by changing the sampling frequency. Ordinarily, this would be accomplished by use of a single digital match filter. This type of filtering scheme allows for the filter to be modified by changing the sampling frequency in order to filter variable bandwidth signals.

However, in using such a analog/digital hybrid scheme it is not viable to reduce the sampling rate below the level dictated by the front-end anti-aliasing filter. This level can also be defined as the Nyquist rate (twice the Nyquist frequency which is equivalent to the width of the band of frequencies within the waveform). In practice, when the sampling frequency falls below the Nyquist rate aliasing occurs. When aliasing occurs, frequencies greater than one-half the sampling rate become indistinguishable from frequencies in the fundamental bandwidth and the overall system is disrupted. For video communications this would result in unacceptable degradation to the picture and sound. To compensate for this anomaly at lower sampling rates, a lowpass filter with a lowpass bandwidth is required. This means that for a typical application numerous filters will be required to achieve the necessary output. These front end analog filters tend to be bulky and, thus take up critical area on the surface of an integrated circuit. In addition, the use of numerous filters in a given demodulator design readily becomes cost prohibitive in commercial applications where today's markets demand cost efficiency.

Alternatively, systems have employed the use of pure digital circuitry to implement the variable bandwidth filter structure. The digital variable bandwidth filter structure is typically constructed from decimation filters. Decimation is a means by which the digitized video waveform is image scaled. By using filters to accomplish the scaling, aliasing concerns are limited and image artifacts are smoothed over allowing for further signal processing to proceed error-free. Filter decimation is typically accomplished by bandwidth limiting the image horizontally and vertically. However, each scaling factor requires different filter coefficients and adds to the complexity of the filter. Thus, in these systems when the need arises to tune to lower frequency rates it becomes imperative to use filters with narrower bandwidths. As the bandwidth narrows in these filters the complexity of the filters increases, accordingly. This results in the need to implement filters which are large in size and require high power in operation. As is the case with a analog/digital hybrid scheme, use of a pure digital scheme presents the similar problems of area consumption on a given integrated circuit and, ultimately, cost efficiency. The cost of implementing large complex decimation filters readily becomes impractical in the current commercial integrated circuit market.

BRIEF DESCRIPTION OF THE INVENTION

The present invention implements a digital variable rate demodulator within a receiver which operates close to the Nyquist rate. This serves to recover correct timing and filter adjacent channels. The samples of an incoming data signal are divided into phases and combined into phase vectors. Intermediate points within a given phase vector are determined by interpolation. The data is then converted into a weighted sum for the purpose of decimating down to the baud rate. The signal-to-noise ratio is then optimized by estimating the likelihood of occurrence of a given symbol within the waveform and filtering the near Nyquist data rate down to a one sample per symbol data rate.

OBJECTS AND ADVANTAGES OF THE INVENTION

Accordingly, it is an object of the present invention to provide a filter scheme within a digital rate demodulator which occupies far less surface area on an integrated circuit in comparison to prior art filter schemes.

It is a further advantage of the present invention to provide a filter scheme within a digital rate demodulator which uses proportionally less filters than prior art demodulators.

It is a further advantage of the present invention to provide a variable rate receiver which operates close to the Nyquist rate and, therefore, because of this lower sampling rate, requires far less power consumption than prior art receivers.

It is a further advantage of the present invention to provide a variable rate receiver which combines the function of the timing recovery with decimation filter implementation.

These and many other objects and advantages of the present invention will become apparent to those of ordinary skill in the art from a consideration of the drawings and ensuing description of the invention.

DETAILED DESCRIPTION OF THE PREFERRED EMBODIMENT

Those of ordinary skill in the art will realize that the following description of the present invention is illustrative only and not in any way limiting. Other embodiments of the invention will readily suggest themselves to such persons skilled in the art.

Figure 1:
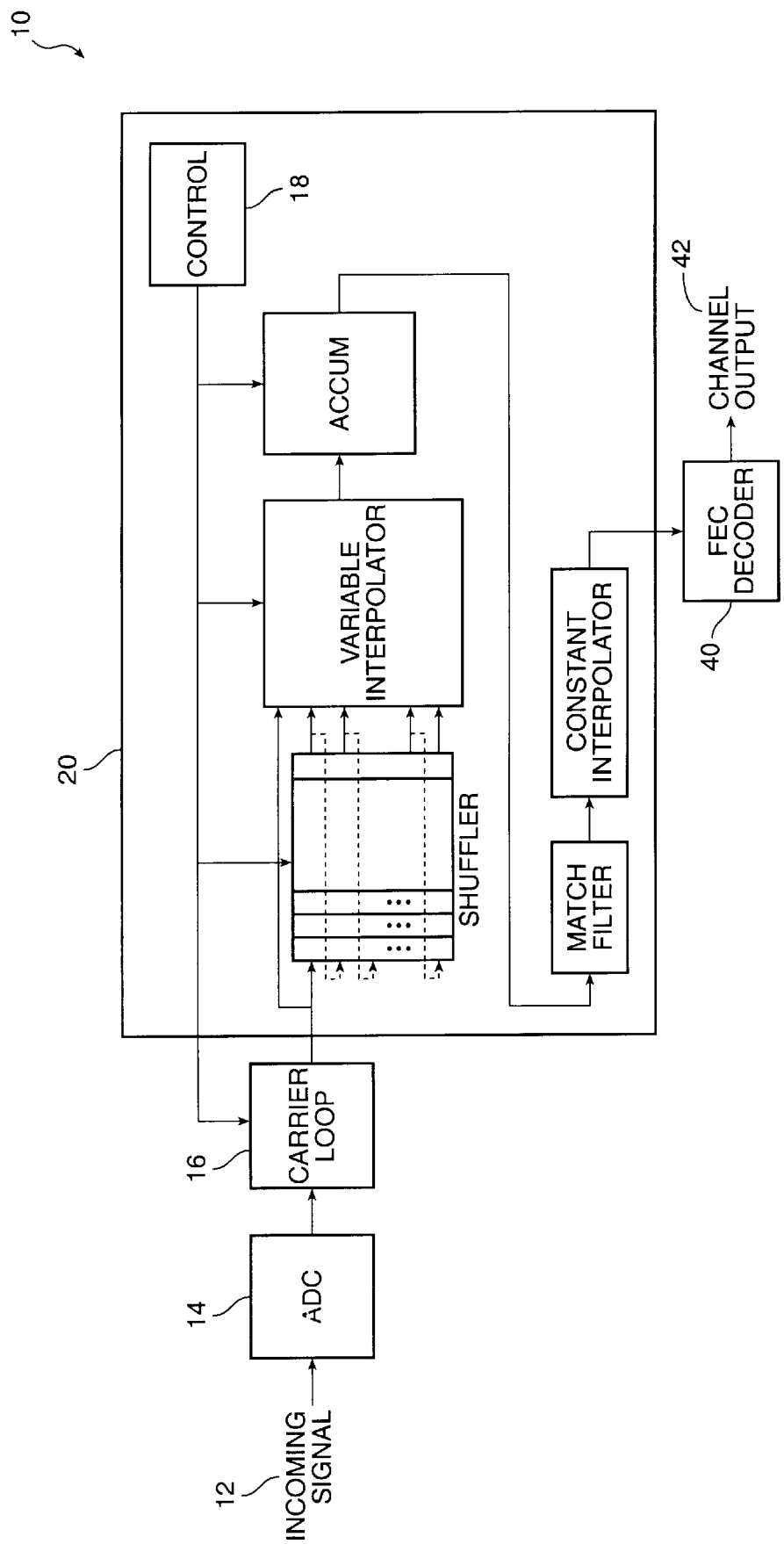
FIG. 1 is a system block diagram of the overall system in accordance with a presently preferred embodiment of the present invention.

The present invention implements a digital variable rate demodulator scheme within a receiver which operates close to the Nyquist rate. Data being input into the receiver is modulated, non-linear shaped data which is randomly encrypted in a digitized data stream. The demodulation process results in structured binary data with well defined symbol boundaries. FIG. 1 depicts a system block diagram of the overall system in accordance with a presently preferred embodiment of the present invention. A digital signal receiver system 10 which processes the incoming signal 12, includes an analog to digital (A/D) converter 14 which converts the analog signal to digital data form by sampling the signal at a specific sampling frequency, a carrier loop 16 which interacts with a control module 18 to adjust and monitor the frequency signal to approximate the DC rate, the demodulation scheme 20 and a forward error correction decoder 40 which insures that the signal, prior to channel output 42 is free of corrupt data and matches the data output from the timing loop with values of symbols at the transmitter as a means of decoding. The control module 18 has a first control module and a second control module.

Figure 2:
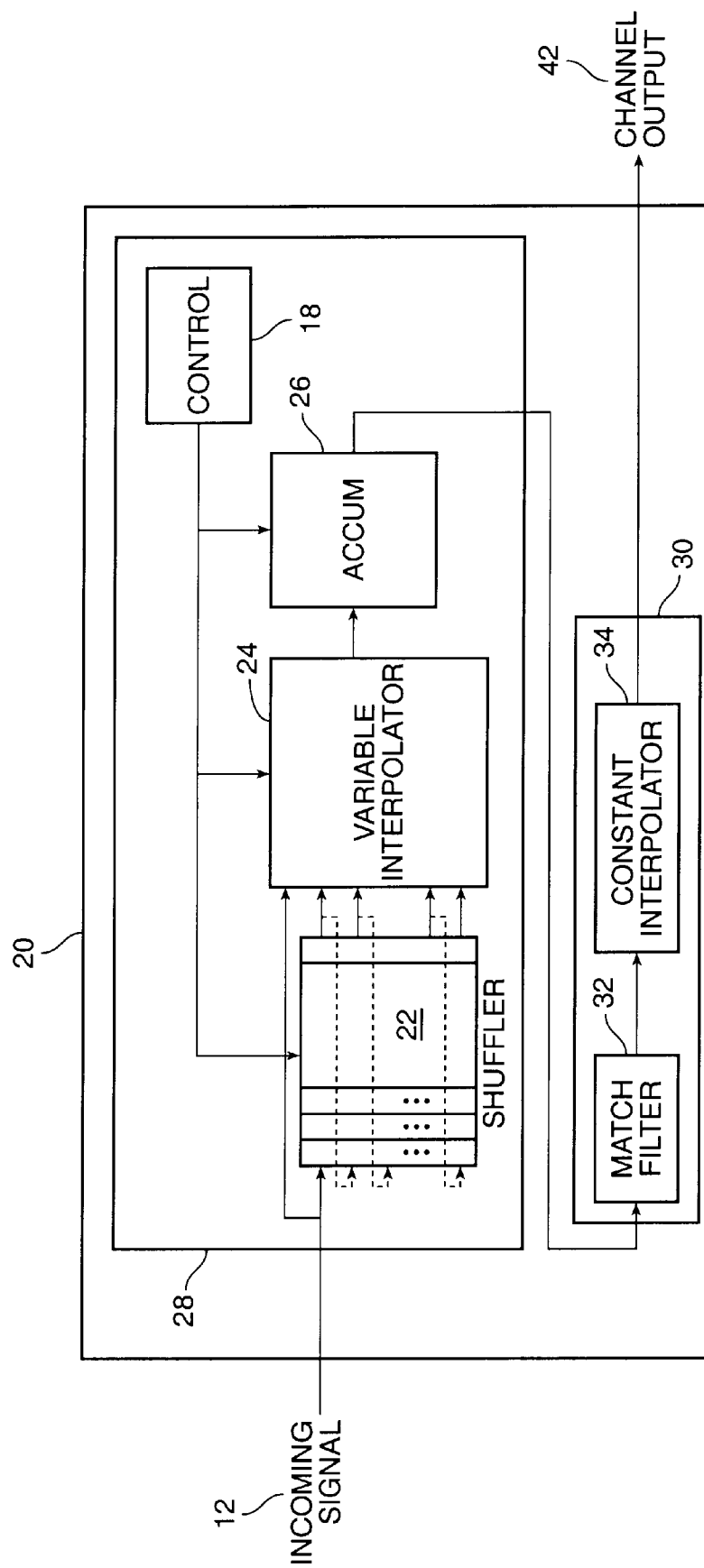
FIG. 2 is a system block diagram depicting the digital variable rate demodulator apparatus in accordance with a presently preferred embodiment of the present invention.

FIG. 2 depicts a block diagram of the digital variable rate demodulator apparatus 20 operating close to the Nyquist rate, in accordance with a presently preferred embodiment of the present invention. A shuffler 22, a variable interpolator 24 and an accumulator 26 functioning orthogonally in conjunction with a control module 18 implement a maximally decimated filter scheme 28. The timing recovery loop 30 is carried out by the combination of the match filter 32 and the constant interpolator 34.

Figure 3:
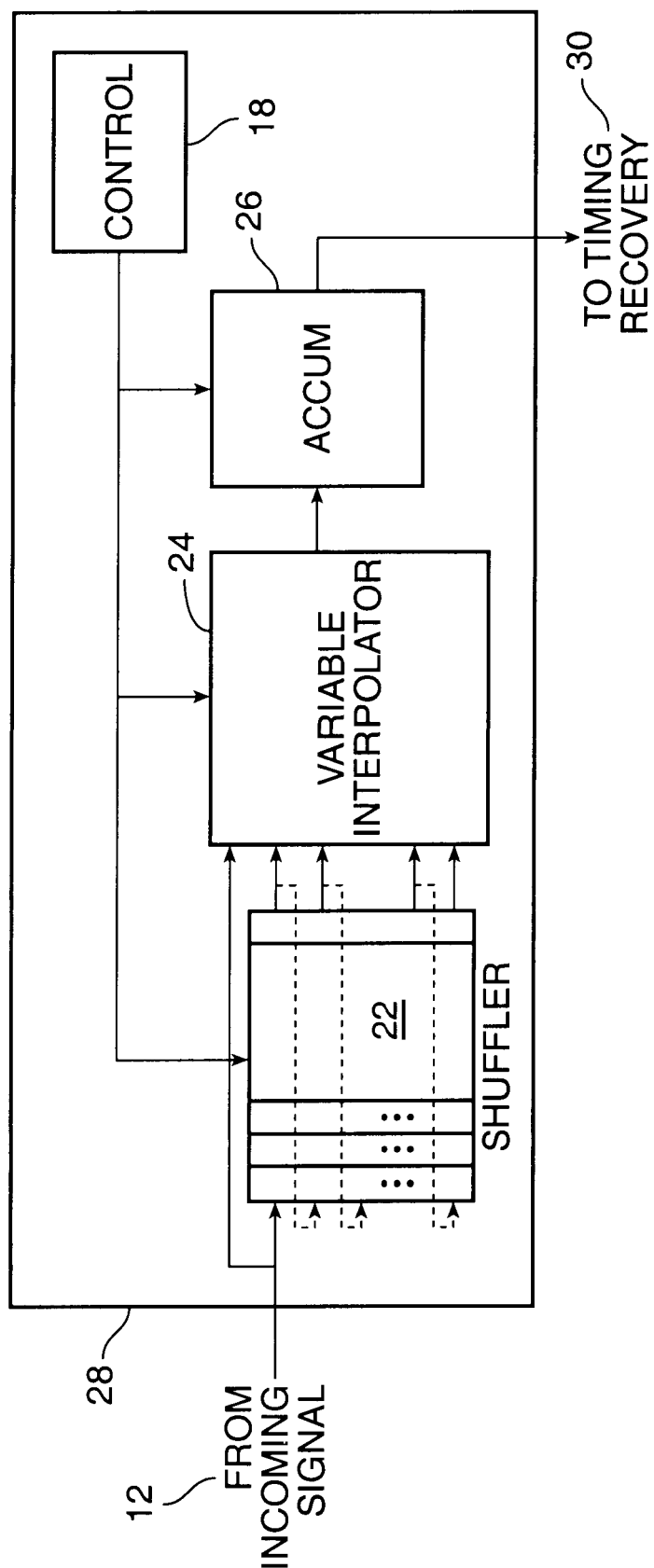
FIG. 3 is a system block diagram illustrating the maximally decimated filter scheme in accordance with a presently preferred embodiment of the present invention.

Focusing on the FIG. 3 block diagram illustrating the maximally decimated filter scheme 28 in accordance with a presently preferred embodiment of the present invention, the shuffler 22 takes the incoming signal 12 and, at each clock cycle, divides it into smaller sequences; each sequence containing different phases of the signal. The phases are then assembled into phase vectors. A shuffler 22, typically, consists of a series of levels of delays, each level having more delays than the previous level. A control module 18 is coupled to the shuffler 22 for determining the number of samples to be taken and the distance between samples in a given phase vector. Shufflers are well known in the prior art and for this invention numerous designs of the shuffler can be employed which will satisfy the objective.

Figure 4:
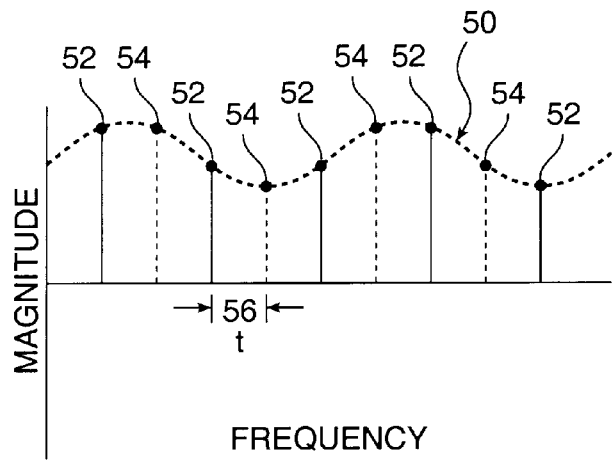
FIG. 4 is a waveform diagram depicting phase vectors output from the shuffler and interpolated points in between in accordance with a presently preferred embodiment of the present invention.

The output of the shuffler 22 is then processed through a variable interpolator 24. The variable interpolator 24 in this scheme serves the dual functions of interpolation, as well as, decimation. The variable interpolator 24 passes all energy forward while introducing a shift in time. FIG. 4 illustrates a waveform diagram 50 configured from the vector data output from the shuffler 22 and the points in between which result from the variable interpolator 24 procedure. In this illustration the solid lines 52 exemplify the phase vectors output from the shuffler 22 and the dotted lines 54 represent the interpolated points in between along the waveform 50. The determination of which points in between require interpolation, known as the delay time 56, is controlled by the variable interpolator 24 interacting with the control module 18. By its very nature, this being a variable interpolator, it allows for non-constant or variable delays to by introduced into the process. The amount of the delay is determined by the amount of decimation required and the timing error. The timing error is defined as the distance between the A/D sample and the optimum sampling point where the signal to noise ratio is minimized. Any interpolator which is known in the art can be implemented in this scheme, so long as, the interpolator is variable, allowing for construction of filters for any delay less than, greater than or equal to the sample clock.

The phase vector data along with the interpolated data is next processed through an accumulation procedure. Here, the accumulator 26 adds the estimated values outputted for a required sample and divides by the number of estimates taken to arrive at an averaged value for a required sample. The accumulator 26 in this scheme can be implement by use of a standard adder and register which are known in the prior art.

The combination of the shuffler 22, the variable interpolator 24 and the accumulator 26 working in unison through the directive of the control module 18 implement a maximally decimated filter scheme 28. The effect of which is to low pass data and reject all high pass components, so that, a filtered waveform close to the Nyquist rate results. Such a minimal complexity implementation replaces the use of numerous decimation filters and, in doing so, frees up valuable area on the surface of the integrated circuit.

Figure 5:
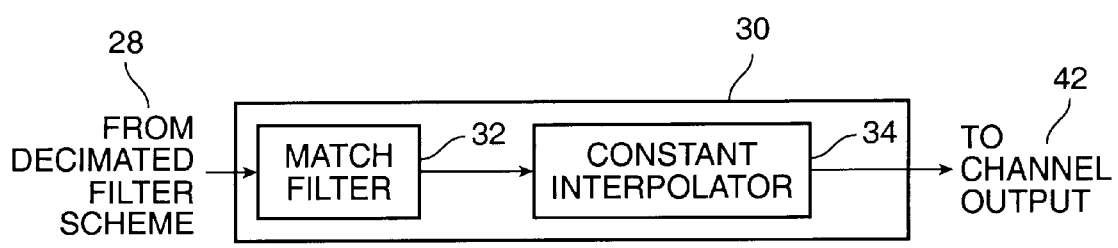
FIG. 5 is a block diagram illustrating the timing recovery scheme in accordance with a presently preferred embodiment of the present invention.

Following the decimation filter scheme 28 the signal undergoes timing recovery 30 in the match filter 32 and constant interpolator 34 combination. FIG. 5 is a block diagram depicting this timing recovery scheme in accordance with a presently preferred embodiment of the present invention. Timing recovery is accomplished by adjusting the phase and frequency of the samples. For this invention the frequency and phase of the match filter 32 and the constant interpolator 34 are fixed by design. The function of the match filter 32 and constant interpolator 34 combination is to provide optimization for the signal to noise ratio at output and provide a measurement of the likelihood of each symbol.

Figure 6:
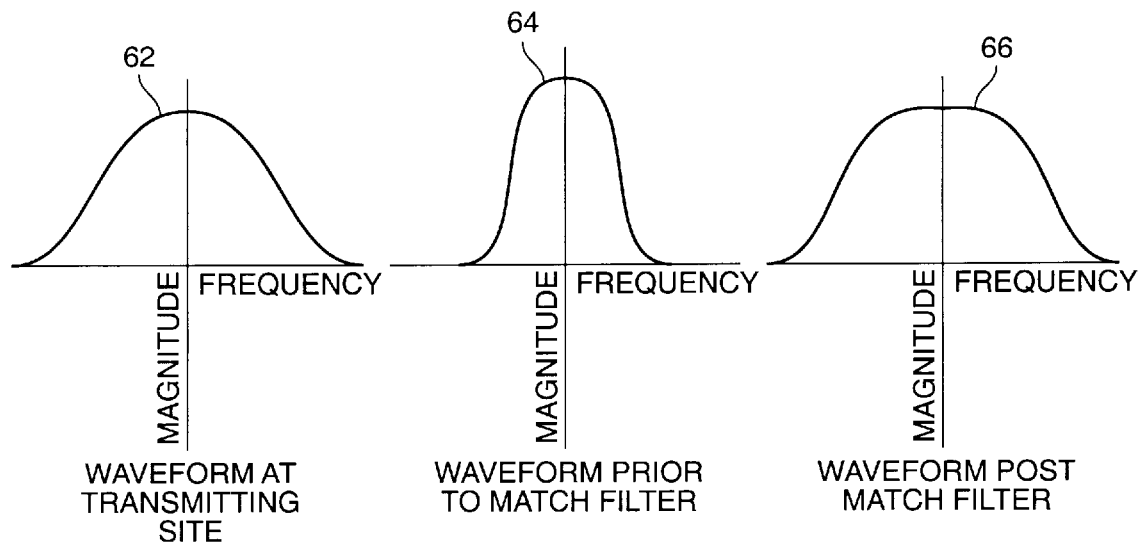
FIG. 6 is an illustration of the shaped waveform at the transmittal site, the waveform prior to input at the match filter and waveform output after the match filter in accordance with a presently preferred embodiment of the present invention.

The match filter 32 which is designed according to the minimum oversampling ratio required for the highest data rate and which operates at the Nyquist rate for a given application, initiates the optimization of the signal to noise ratio. Since the decimation filter scheme 28 passes the whole spectrum, the match filter 32 serves to reshape the waveform to match the configuration of the waveform outputted by the shaping filter at the signal transmitting site. FIG. 6 illustrates the concept of how the waveform is reshaped at the match filter to match the waveform at the transmitting site. The first waveform in the sequence 62 depicts the waveform at the transmittal site, the second waveform 64 is illustrative of a waveform which has been transmitted, undergone A/D conversion and decimation filtration and the last waveform in the sequence 66 is the reshaped post match filter illustration. The constant interpolator 34 follows the match filter 32 for the purpose of introducing a time shift. The output of the match filter 32 is a non-integer value Nyquist rate number, typically 1.35 or 1.25 samples per symbol. Timing recovery is accomplished at the constant interpolator by synchronizing this rate down to 1.0 sample per symbol. Thus, the constant interpolator 34 generates the optimal sampling points of the match filter 32 for each symbol duration. The output of the constant interpolator 34 results in a measurement of the likelihood of each symbol and optimization of the signal to noise ratio.

Figure 7:
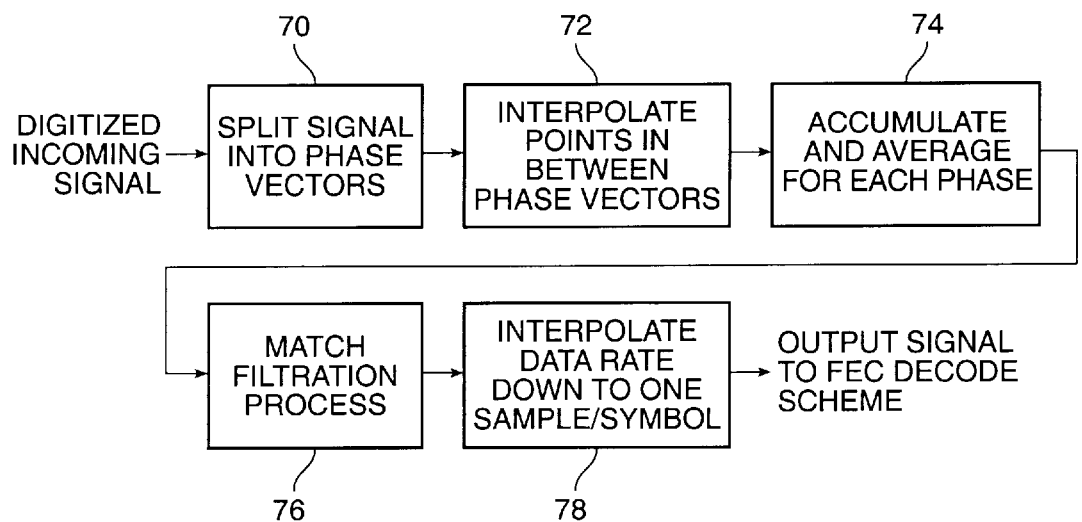
FIG. 7 is a flowchart illustrating a presently preferred method of carrying out the present invention.

The present invention can also be represented as a method for digital variable rate demodulation. FIG. 7 is a flowchart depicting a presently preferred method of carrying out the preferred embodiment of the present invention. At step 70 the digitized incoming signal operating at or near the Nyquist rate is split into phase vectors. The phase vectors make up points along a waveform and in step 72 interpolation takes place in order to ascertain further points along the waveform in between those points represented by the phase vectors. In step 74 the values for a given symbol are accumulated and averaged resulting in a stream of weighted sums for each respective phase. The combination of steps 72, 74 and 76 working orthogonally and simultaneously implement a maximally decimated filtration process. The signal then undergoes timing recovery in steps 76 and 78. First, in step 76 the signal undergoes a match filtration process to equate the waveform to the waveform transmitted and to predict the likelihood of a given symbol in the waveform and in step 78 a constant interpolation procedure is employed to take the rate down from Nyquist to one sample per symbol resulting in a signal which has a maximized signal to noise ratio.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

I claim:

1. A digital variable rate demodulator comprising:

a shuffler having an input and an output;

a variable interpolator having an input and an output; said output of said shuffler coupled to said input of said variable interpolator;

an accumulator having an input and an output, said output of said variable interpolator coupled to said input of said accumulator;

a match filter having an input and an output, said output of said accumulator coupled to said input of said match filter; and a constant interpolator having an input and an output, said output of said match filter coupled to said input of said constant interpolator.

2. The digital variable rate demodulator in claim 1 wherein said shuffler further includes a second input.

3. The digital variable rate demodulator in claim 2 further comprising a control module coupled to said second input of said shuffler.

4. The digital variable rate demodulator in claim 1 wherein said variable interpolator further includes a second input.

5. The digital variable rate demodulator in claim 4 further comprising a control module coupled to said second input of said variable interpolator.

6. The digital variable rate demodulator in claim 1 wherein said accumulator further including a second input.

7. The digital variable rate demodulator in claim 6 further comprising a control module coupled to said second input of said accumulator.

8. A digital variable rate demodulator comprising:

a shuffler having a first input, a second input, and an output;

a variable rate interpolator having a first input, a second input and an output, said output of said shuffler coupled to said first input of said variable rate interpolator;

an accumulator having a first input, a second input and an output, said output of said variable rate interpolator coupled to said first input of said accumulator;

a match filter having an input and an output, said output of said accumulator coupled to said input of said match filter;

a constant interpolator having an input and an output, said output of said match filter coupled to said input of said constant interpolator; and a control module with a first output, a second output, and a third output, said first output of said control module coupled to said second input of said shuffler, said second output of said control module coupled to said second input of said variable interpolator, said third output of said control module coupled to said second input of said accumulator.

9. A digital maximally decimated filter comprising:

a shuffler having a first input, a second input, and an output;

a variable rate interpolator having a first input, a second input and an output, said output of said shuffler coupled to said first input of said variable rate interpolator;

an accumulator having a first input, a second input and an output, said output of said variable rate interpolator coupled to said first input of said accumulator; and a control module with a first output, a second output, and a third output, said first output of said control module coupled to said second input of said shuffler, said second output of said control module coupled to said second input of said variable interpolator, said third output of said control module coupled to said second input of said accumulator.

10. A system for receiving digital signals comprising:

an analog to digital signal converter having an input and an output;

a carrier loop having a first input, a second input and an output, said output of said analog to digital converter coupled to said first input of said carrier loop;

a shuffler having a first input, a second input, and an output, said output of said carrier loop coupled to said first input of said shuffler;

a variable rate interpolator having a first input, a second input and an output, said output of said shuffler coupled to said first input of said variable rate interpolator;

an accumulator having a first input, a second input and an output, said output of said variable rate interpolator coupled to said first input of said accumulator;

a match filter having an input and an output, said output of said accumulator coupled to said input of said match filter;

a constant interpolator having an input and an output, said output of said match filter coupled to said input of said constant interpolator;

a first control module having an output, said output of said first control module coupled to said second input of said carrier loop;

a second control module having a first output, a second output, and a third output, said first output of said second control module coupled to said second input of said shuffler, said second output of said second control module coupled to said second input of said variable interpolator, said third output of said second control module coupled to said second input of said accumulator; and a forward error correction decoder having an input and an output, said output of said constant interpolator coupled to said input of said forward error correction decoder.

11. An apparatus for digital variable rate demodulation comprising:

a means for dividing the samples of each clock cycle signal into a series of phases and gathering the phases into phase vectors;

a means for interpolating points in between of said phase vectors;

a means for decimating down to a baud rate the data output from said means for interpolating;

a means for averaging the output of said means for interpolating the points in between of said phase vector;

a means for optimizing a signal to noise ratio from said means for averaging;

a means for filtering a non-integer near Nyquist data rate down to a data rate of one sample per symbol from said means for optimizing; and a means for estimating the likelihood of occurrence of a given symbol within the waveform from said means for filtering.

12. A method for digital variable rate demodulation comprising:

splitting a digital signal into phase vectors;

outputting a stream of data points including interpolated data points in each of said phase vectors;

decimating said stream of data points down to a baud rate;

averaging an output of said stream of data points including interpolated data points;

filtering a non-integer near Nyquist data rate down to a data rate of one sample per symbol; and estimating the likelihood of occurrence of a given symbol within the waveform for the purpose of optimizing signal to noise ratio.

13. The method of claim 12 wherein said splitting step includes the sub-step of using a shuffler to split said digital signal into said phase vectors.

14. The method of claim 12 wherein said outputting step includes the sub-steps of:

receiving commands on which point to interpolate from a control module; and using an interpolator in conjunction with the data in each of said phase vectors to interpolate an estimate for the waveform.

15. The method of claim 12 wherein said decimating step includes the sub-step of using an accumulator to decimate said stream of data points.

16. The method of claim 12 wherein said averaging step includes the sub-step of using an accumulator to average said output of said stream of data points.

17. The method of claim 12 wherein said filtering step includes the sub-step of using a match filter to filter said data rate.

18. The method of claim 12 wherein said estimating step includes the sub-step of using a constant interpolator to estimate said likelihood of occurrence of a given symbol.

* * * * *